United States Patent
Heaphy

[11] 3,929,999
[45] Dec. 30, 1975

[54] ORAL HYPOGLYCEMIC METHOD
[76] Inventor: Clifford John Heaphy, 1635 Harvard N.E., Albuquerque, N. Mex. 87106
[22] Filed: Sept. 26, 1974
[21] Appl. No.: 509,448

Related U.S. Application Data
[62] Division of Ser. No. 314,545, Dec. 12, 1972, Pat. No. 3,852,353.

[52] U.S. Cl. ............................................. 424/228
[51] Int. Cl.² ......................................... A61K 31/63
[58] Field of Search ................................... 424/228

[56] References Cited
UNITED STATES PATENTS
2,908,713  10/1959  Mammals et al. ............... 260/564 B Primary Examiner—Jerome D. Goldberg
Attorney, Agent, or Firm—Robert M. Betz; Richard A. Bachand

[57] ABSTRACT
An oral hypoglycemic compound for use in the treatment of diabetes mellitus having the general formula

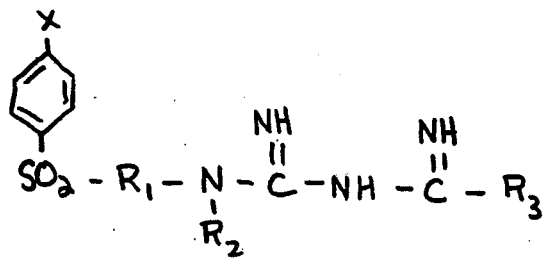

and which is one of the group consisting of:
a. the compound wherein $R_1$ is an aliphatic series containing 2 to 8 carbon atoms;
b. the compound wherein $R_2 = R_3$ and is a member of the group consisting of hydrogen, aliphatic, and aromatic radicals; and
c. the compound wherein $X$ represents an amino or a substituted amino radical.

The compound is prepared by synthesizing p-amino benzenesulfonamide through the chlorsulfonation of acetanilide and placing a radical group in the para position of the benzene ring.

The compound may be incorporated with therapeutically acceptable carriers to make compositions adapted to be administered orally in the treatment of diabetes mellitus.

The compound is intended to aid in the regulation of metabolic disturbance in diabetes mellitus not only by stimulating the production and release of insulin but also by functioning as a substitute for insulin in this regulatory process.

1 Claim, No Drawings

ORAL HYPOGLYCEMIC METHOD

This is a division, of application Ser. No. 314,545, filed Dec. 12, 1972 now U.S. Pat. No. 3,852,353.

BACKGROUND

1. Field of the Invention

This invention relates to a composition of matter and to the manner of its utilization. More particularly it is concerned with a composition of matter which contains as its essential constituent a basic sulfonamide, p-aminobenzenesulfonamide, commonly known as sulfanilimide, which is chemically combined with a biguanide derivative to produce a new compound effective as primary therapy in the treatment of diabetes mellitus.

2. Description of the Priot Art

According to a recent National Health Interview Survey, there are estimated to be about 2.8 million diagnosed diabetics in the United States today, and the total number of persons having the disease in this country is considered to be much larger, simply because many individuals don't know they have the disease and may not have yet developed symptoms. However, despite intensive research into this major health problem, the treatment of diabetes mellitus is still far from complete.

Insulin is of course used extensively in diabetes therapy. But since insulin itself can not be administered orally and must therefore be injected, oral insulin substitutes have been developed. But such substitutes have not been completely safe and effective. The biggest problem has been to find a drug that would reduce the blood sugar level quickly, help the body metabolize carbohydrates and not produce permanent damage to the system.

Today there are a number of oral hypoglycemic agents available, all of which have been successful to a degree. They fall into two groups — the sulfonylureas and the biguanides.

The first of these groups, the sulfonylureas, includes tolbutamide, chlorpropamide, tolazamide, and acetohexamide. The mechanism of action of these drugs is generally to increase the release of insulin from the functioning beta cells of the intact pancreas. The biguanides, and in particular phenformin hydrochloride, are completely unrelated to the sulfonylureas in chemical structure and mode of action. They do not stimulate insulin production, but appear rather to aid in reducing the generation of fats, in facilitating the release of fatty acids and glycerol from the adipose tissue.

Both of these general types of oral insulin substitutes produce toxic effects to one degree or another, such as nausea, vomiting, and mental confusion, and dosage must be carefully controlled. But perhaps most significantly they are of negligible value in the treatment of the juvenile onset diabetic and in the more serious adult cases, whre insulin injections must still be used extensively.

SUMMARY OF THE INVENTION

Objects

It is a general object of this invention to provide an oral hypoglycemic compound which aids in the regulation of metabolic disturbance in diabetes mellitus not only by stimulating the production and release of insulin from the pancreas but also by functioning as a substitute for insulin in this regulatory process.

It is known that, in certain instances, combined therapy with oral hypoglycemic agents in the sulfonylurea group and phenformin (phenethylhydrochloride) is employed to obtain improved response in diabetic patients, but it is noted that, to applicant's knowledge, no chemical combination of any two compounds falling respectively into the sulfonylurea and biguanide groups has been attempted.

It is recognized that glucose must be supplied to the body cells and it is hypothesized that the sulfonylureas stimulate this process by increasing cell permeability while the biguanides bring the glucose into the cells by a different mode of action not yet fully understood.

It is therefore a specific object of this invention to provide an oral insulin substitute by chemically combining the differing modes of action of existing hypoglycemic agents in the sulfonylurea and biguanide groups.

It is yet another object of this invention to provide a hypoglycemic compound which is free of toxic side effects such as nausea, vomiting, and other gastrointestinal disturbances.

It is a still further object of this invention to provide a hypoglycemic compound effective in the treatment of juvenile-onset diabetes mellitus.

The invention accordingly comprises a compound having the general formula:

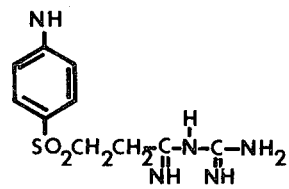

and which is one of the group consisting of:
a. the compound wherein $R_1$ is an aliphatic containing 2 to 8 carbon atoms:
b. the compound wherein $R_2$ and $R_3$ are both members of the group consisting of hydrogen, aliphatic, and aromatic radicals; and
c. the compound wherein X represents an amino or a substituted amino radical. and encompasses the method of treating diabetes mellitus which comprises orally administering such compositions to a human.

The characteristics and properties of the compound of this invention and the relationship of its constituents will be exemplified in the composition hereinafter described and the scope of the invention will be understood from the claims.

Detailed Description

The new compound(s) of this invention may be prepared according to known methods by synthesizing p-amino benzenesulfonamide through the chlorosulfonation of acetanilide and placing a radical group in the para position of the benzene ring consisting of

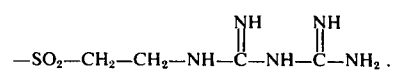

The resulting compound(s) may be represented by the general formula:

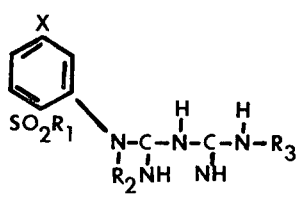

where $X$, $R_1$, $R_2$, and $R_3$ have the previously given meaning.

Any selection of radicals within the specified groups may be made without affecting the activity of the resultant compound.

The following example is illustrative of the compound(s) of this invention and the procedure for its (their) preparation, and will, it is believed, serve to make apparent the compound(s) embraced by the general formula given above and the preparation thereof, respectively, it being noted that the utility indicated for the several compounds flows from the elements of the general structure common to all of them.

Preparation of Compound 100 mg. of 1-phenethylbiguanide monohydrochloride in powdered form is mixed with 18.755gm. (0.155mol) of dry, finely powdered acetanilide and added in small portions and with good stirring of 107.364 gm. (0.92 mol) of chlorosulfonic acid in a dry flask cooled to 10–15 deg. C in a water bath with ice. When the additive has been substantially dissolved, the mixture is allowed to warm to room temperature and is then heated in a steam bath for 10 minutes to complete the reaction. The reaction mixture is then cooled to room temperature using an ice bath and poured slowly and with stirring over 600 gm. of cracked ice in 100 ml. of water, forming a precipitate. The product is then collected by suction filtration, washed and dried.

75 ml of concentrated ammonium hydroxide is then added to the above product and the mixture is heated in a steam bath for 30 minutes, and then cooled to room temperature. The reaction mixture is acidified with sulfuric acid and recooled. The new compound of this invention is formed as a precipitate, collected by suction filtration, washed and dried.

The following specific examples present illustrative data demonstrating the effectiveness of the novel compound as an oral diabetic agent. The new compound was evaluated by the oral route in terms of its capacity to lower the blood sugar level, raise the production of insulin and to reduce the generation of triglycerides in normal laboratory test animals. The experiments also helped to determine whether the new compound would work with minimal permanent harm to the test animals and without undesirable side effects.

The tests were performed on laboratory beagles. In each case, after oral administration of the new compound in a dosage of 2 mg/kilo, comparable by weight to a 3 gm dosage for an average human, a fasting blood sugar sample was taken at zero hour. Glucose was then injected, and further blood samples were taken at intervals of 15,30,60 and 90 minutes. The findings are given in the following Tables I, II and III.:

Table I

Blood Glucose Level (mg. per 100 m. liters)

| Time (min.) | Dog. A | Dog. B |
| --- | --- | --- |
| 0 | 113 | 102 |
| 15 | 399 | 477 |
| 30 | 235 | 256 |
| 60 | 106 | 133 |
| 90 | 110 | 111 |

Table II

Insulin Level (Micrograms per m. liter)

| Time (min.) | Dog. A | Dog. B |
| --- | --- | --- |
| 0 | 23 | 17 |
| 15 | 171 | 83 |
| 30 | 158 | 56 |
| 60 | 7 | 17 |
| 90 | 16 | 37 |

Table III

Triglyceride Level (mg %)

| Time (min.) | Dog. A | Dog. B |
| --- | --- | --- |
| 0 | 61 | 51 |
| 15 | 43 | 43 |
| 30 | 49 | 41 |
| 60 | 39 | 47 |
| 90 | 48 | 50 |

Note:
These results were determined at professional laboratories in Albuquerque, New Mexico.

The results of these tests showed that the new compound reduced the glucose level and returned it substantially to normal in about 90 minutes. The insulin level increased significantly and then stabilized to normal, and the triglycerides decreased significantly and then returned to normal. The drug has produced no apparent side effects.

While the exact mode of action of the new compound is not as yet completely understood and must await further research it is apparent from the tests performed thus far that the basic premise is established that the beneficial effects achieved by the sulfonylureas and the biguanides separately can be successfully combined chemically in a single compound and there appears to be reasonable likelihood that the new compound will function without harmful side effects. If this proves to be substantiated the new compounds promises to offer hope for therapeutic effectiveness not heretofore achieved. With further understanding of the mechanism of the new compound there may also be reason to hope that it will provide the answer to an effective oral hypoglycemic agent for the juvenile diabetic.

It will be understood that although the new compound described herein promises to be effective in small dosages, the exact amount required will vary with conditions such as severity of diabetic symptoms, body weight, and peculiarities of patient response.

Furthermore, it is to be understood that in interpretation of the claims appended hereto that the phrase "treating diabetes mellitus" is intended to comprehend obtaining reduction and control of blood glucose levels and other major insulin functions in a diabetic patient by any mode of action inherent in the new compound.

It is to be additionally understood that these skilled in the pharmaceutical art will have no difficulty in combining the new compound with a therapeutically acceptable excipient or carrier of non-toxic and inert character, in order to facilitate formation of an oral tablet adapted to permit quick solution and dispersion of the active ingredients therein.

It will thus be seen that the primary object set forth above is efficiently attained and since certain changes may be made in the above composition of matter without departing from the scope of the invention, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

What is claimed is:

1. The method of treating diabetes mellitus which comprises orally administering to a diabetic human an anti-diabetic effective amount of a composition containing as an essential active ingredient:

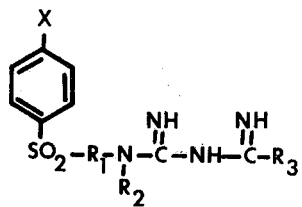

* * * * *

UNITED STATES PATENT AND TRADEMARK OFFICE
CERTIFICATE OF CORRECTION

PATENT NO. : 3,929,999
DATED : December 30, 1975
INVENTOR(S) : CLIFFORD J. HEAPHY It is certified that error appears in the above—identified patent and that said Letters Patent are hereby corrected as shown below:

Column 2, line 35, the formula should be --

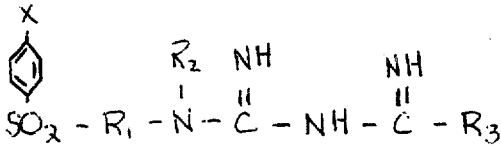

Column 2, line 42, after "aliphatic" insert --series--
Column 3, line 5, the formula should be --

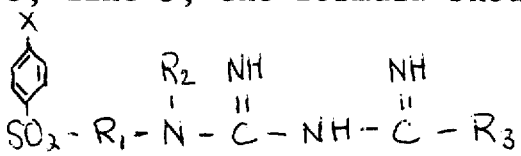

Column 4, line 48, "compounds" should be --compound--
Column 6, line 5, (claim 1, line 5) the formula should be--

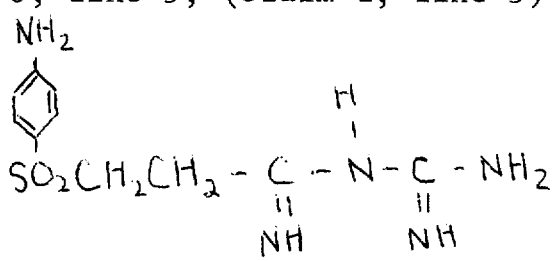

Signed and Sealed this twenty-seventh Day of April 1976

[SEAL]

Attest:

RUTH C. MASON
Attesting Officer

C. MARSHALL DANN
Commissioner of Patents and Trademarks